3,517,101
CRYSTALLIZATION OF NYSTATIN
Robert Carlyle Esse, Pearl River, N.Y., assignor to American Cyanamid Company, Stamford, Conn., a corporation of Maine
No Drawing. Filed July 2, 1968, Ser. No. 741,911
Int. Cl. A61k 21/00
U.S. Cl. 424—123                        10 Claims

ABSTRACT OF THE DISCLOSURE

This disclosure describes a process for recovering highly purified crystalline nystatin from a suspension of impure nystatin in a liquid phase consisting essentially of water and a water immiscible organic solvent by adding a diluting solvent to the suspension, adjusting the pH of the resulting mixture to about 2.5 to effect solubilization of the nystatin, clarifying the mixture by filtration, adjusting the pH of the filtrate to about 7.0, and recovering the resulting precipitate of crystalline nystatin therefrom.

BRIEF SUMMARY OF THE INVENTION

The present invention relates to the antifungal antibiotic nystatin (originally termed fungicidin) and, more particularly, is concerned with a novel process of recovering highly purified crystalline nystatin from a suspension of impure nystatin in a liquid phase consisting essentially of water and an aliphatic oxygen-containing water immiscible organic solvent in which nystatin is substantially insoluble. The present invention is based upon the discovery that the addition to such a suspension of a diluting solvent selected from the group consisting of ethanol, 2-methoxyethanol, 2-ethoxyethanol, dimethylformamide and dioxane followed by adjustment of the pH of the resulting mixture to from about 2.0 to about 3.5 with an acid effects solubilization of the nystatin. Clarification of the acidified mixture followed by adjustment of the pH of the clarified solution to from about 4.5 to about 8.0 with a base results in precipitation of highly purified crystalline nystatin which may be recovered by any convenient means.

DETAILED DESCRIPTION OF THE INVENTION

The antibiotic nystatin (fungicidin) and its method of preparation from *Streptomyces noursei* are described in U.S. Pat. No. 2,797,183 to Hazen et al. See also Hazen et al., "Fungicidin, an Antibiotic Produced by a Soil Antinomycete," Proc. Soc. Exptl. Biol. Med. 76, 93 (1950) and Brown et al., "Effect of Fungicidin (nystatin) in Mice Injected With Lethal Mixtures of Aureomycin and *Candida albicans*," Science 117, 609 (1953). The antibiotic is referred to hereinafter by the single term "nystatin."

Crude concentrates of nystatin can be prepared by extracting the mycelial mat with several portions of methanol and then processing the methanolic solution by fractional precipitation with ethyl acetate, washing the precipitate with 0.85% sodium chloride solution, redissolving in methanol and fractional precipitation with diethyl ether. See Hazen et al., U.S. Pat. No. 2,797,183, supra. Low yields of active crystalline material can be obtained from the resulting crude concentrates by distribution between n-butanol and saline and by partial precipitation from methanol. Crystalline nystatin of high purity has been obtained by distribution of partially purified nystatin concentrates in a biphasic system made up by mixing n-butanol, methanol, water and hexane and allowing this system to stand exposed to air evaporation until a crop of crystals collects at the interface. Dutcher et al., Antibiotics Annual, 1953–1954, pages 191–194, Medical Encyclopedia, Inc., New York, N.Y.

The recovery of nystatin by isopropanol extraction of the whole broth resulting from the fermentation of the nystatin producing *Streptomyces noursei* is described in U.S. Pat. No. 2,786,781 to Vandeputte et al. The partially purified product obtained by the Vandeputte et al. process is a therapeutically useful product of about 65–70% purity. At best, however, it is only partially crystalline and for the most part is substantially non-crystalline or amorphous in character. The purification of nystatin employing methanolic-calcium chloride is also described in U.S. Pat. No. 2,832,719 to Vandeputte and in U.S. Pat. No. 2,865,807 to Dutcher et al. The product obtained by the Vandeputte and Dutcher et al. processes is a therapeutically useful highly refined product substantially crystalline in character.

The processes described above produce crystalline nystatin but are objectionable due to the presence of impurities or low yields. They are also objectionable as they are relatively difficult to control and are not of the type desired in large-scale commercial operations.

It is known that pure crystalline nystatin is indicated for certain uses in the antifungal field and attempts have been made to develop improved, simplified processes of obtaining the pure crystalline material in high yield. Attempts in particular have been made to prepare pure crystalline nystatin directly from the relataively crude partially purified plant material obtained by isopropanol extraction of the whole broth by the use of this material in the methanolic-calcium chloride process. In the past, with the processes available, this approach has not been found to be entirely satisfactory or completely successful as the product obtained was seldom uniform and was also frequently contaminated by amorphous material. With continued investigation, I have discovered that highly purified crystalline nystatin may be recovered from a suspension of impure nystatin in a liquid phase consisting essentially of water and an aliphatic oxygen-containing water immiscible organic solvent in which nystatin is substantially insoluble by utilizing the solubility differences at acid and neutral pH values of nystatin in the homogeneous solvent system obtained by adding a diluting solvent to the suspension.

The aliphatic oxygen-containing organic solvent must be (a) water immiscible and (b) one in which nystatin is substantially insoluble. By water immiscible is meant that it has a limited solubility in water of no more than 25 g. per 100 g. of water at 25° C., preferably a solubility of no more than 10 g. per 100 g. of water at 25° C. Some typical aliphatic oxygen-containing organic solvents in which nystatin is substantially insoluble and which are operable with water to form the liquid phase are set forth in Table I below:

TABLE I

| Organic solvent: | Solubility: g. per 100 g. water at 25° C. |
|---|---|
| n-Butanol | 7.2 |
| Sec.-amyl alcohol | 8.2 |
| n-Amyl acetate | 1.8 |
| n-Butyraldehyde | 6.3 |
| n-Butyl acetate | 1.2 |
| Sec.-butanol | 19.0 |
| n-Butyl propionate | 1.2 |
| Iso-butanol | 5.0 |
| Crotonyl alcohol | 15.0 |
| Dimethyl dioxane | 4.3 |
| Ethyl acetate | 7.6 |
| Ethyl formate | 9.2 |
| Isopropyl acetate | 2.9 |
| Methallyl alcohol | 20.0 |
| Methyl acetate | 24.2 |
| Methylethyl ketone | 23.4 |
| Methylisobutyl ketone | 2.0 |

The suspension of impure nystatin in the liquid phase, the starting material of the novel process of the present invention, may take various forms. For example, impure nystatin may be suspended in an appropriate organic solvent which is merely saturated with water (e.g., wet dimethyl dioxane, wet isopropyl acetate, wet methallyl alcohol, etc.). Impure nystatin may also be suspended in a simple two phase mixture of water and the organic solvent (e.g., water+sec.-amyl alcohol, water+n-butyraldehyde, water+ethyl formate, etc.). The nystatin may be suspended in an emulsion consisting essentially of water and the organic solvent (in this case the organic solvent must have a density of less than 1.0). Such nystatin-containing organic solvent-water emulsions may be readily obtained by adding an appropriate organic solvent (e.g., n-butanol, methylisobutyl ketone, ethyl acetate, etc.) to a Streptomyces noursei fermentation whole harvest mash and agitating the resulting mixture until a nystatin-containing organic solvent-water emulsion upper phase and an aqueous lower phase are formed. The emulsion upper phase is then separated from the aqueous lower phase, most readily by centrifugation. Another form of suspension of impure nystatin in the liquid phase may be readily obtained by adding an appropriate organic solvent to a Streptomyces noursei fermentation whole harvest mash in such proportion that the volume:volume ratio of mash:organic solvent is from about 1:1 to about 5:1. When the liquid phase in which the impure nystatin is suspended is a two phase mixture of water and the organic solvent, the water:organic solvent ratio may vary from about 1:5 to about 5:1 although a 1:1 ratio is preferred. The novel process of the present invention has proven insensitive to these variations under normal operating conditions.

In practicing the novel process of the present invention, a diluting solvent selected from the group consisting of ethanol, 2-methoxyethanol, 2-ethoxyethanol, dimethylformamide, dioxane and mixtures thereof is first added to the suspension of impure nystatin in the liquid phase so as to provide a mixture containing from about 20% to about 100% by volume of diluting solvent based on the volume of liquid phase. This addition of the diluting solvent to the suspension results in a homogeneous solvent system in which the nystatin and associated insoluble impurities are suspended. The pH of the resulting mixture is then adjusted to from about 2.0 to about 3.5, preferably about 2.5, with an acid to effect solubilization of the nystatin. The nature of the acid used to acidify the resulting mixture is not critical and among those acids which have been used successfully may be mentioned hydrochloric, hydrobromic, sulfuric, phosphoric, hypochloric, oxalic and citric. Sulfuric acid is the acid of choice since it is relatively inexpensive and provides high potency nystatin.

The resulting acidified mixture is then clarified to remove any insoluble impurities which remain. Clarification may be effected by filtration or centrifugation, with a clarifying agent such as charcoal if desired, and with or without the use of a filtering aid such as diatomaceous earth.

The pH of the clarified filtrate is then adjusted to from about 4.5 to about 8.0, preferably about 7.0, with a base whereupon crystalline nystatin precipitates from the solution. The nature of the base used for the final pH adjustment is not critical and bases as divergent in character as sodium hydroxide, ammonium hydroxide, triethylamine and triethanolamine have been employed with equivalent success. After an aging period to insure complete crystallization of the nystatin from the solution, the nystatin is recovered by any convenient means such as filtration or centrifugation and dried. The entire process of the present invention may be carried out at a temperature of from about 15° C. to about 35° C., preferably at room temperature (25° C.).

The invention will be described in greater detail in conjunction with the following specific examples.

EXAMPLE 1

Crystallization of nystatin from a butanol fermentation extract using 20% v./v. 2-ethoxyethanol The starting material was prepared by diluting a portion of aqueous whole fermentation mash, obtained by fermenting strains of Streptomyces noursei, with sufficient n-butanol to provide an approximate 1:3 butanol-water ratio. The nystatin separated as an emulsion in the less dense butanol layer which was separated by the use of a centrifuge. A 2 liter portion of this emulsion was combined with 400 milliliters of 2-ethoxyethanol and the apparent pH was adjusted to 2.6 with 9 N $H_2SO_4$, at which point the nystatin dissolved. The pH was raised to 3.5 with triethylamine and the solution was filtered with the aid of diatomaceous earth. The pH of the clear filtrate was adjusted to 7.1 through further addition of triethylamine. The solution was agitated for several hours, during which time the nystatin crystallized as pale-yellow needles. This procedure was carried out at normal room temperature (about 25° C.) and it would appear that 15° C. to 35° C. is a good operating range for this process from the standpoint of convenience, but it is certainly operable outside of this range. The nystatin was collected by filtration and washed with fresh solvent composed of water, n-butanol and 2-ethoxyethanol at pH 7.1. The product was dried in vacuo. The yield was 75% with the product having a microbiological potency of 5000 units/milligram.

EXAMPLE 2

Crystallization of nystatin from a butanol fermentation extract using 100% v./v. 2-ethoxyethanol The procedure of Example 1 was repeated with the exception that 2 liters (100% v./v.) of 2-ethoxyethanol was used. The result in terms of yield and potency was comparable to the results of Example 1.

EXAMPLE 3

Crystallization of nystatin from a butanol fermentation extract using other solvents The procedure of Example 1 was repeated several times using a 20% v./v. portion of either ethanol, dimethylformamide, dioxane, or 2-methoxyethanol. In each case the final wash was made with a mixture of solvents approximating the composition of the mother liquor. In each case the result in terms of yield and potency was comparable to the results of Example 1.

EXAMPLE 4

Crystallization of nystatin from a butanol fermentation extract using various acids The procedure of Example 1 was repeated several times using a different acid for pH adjustment in each case. The results appear in Table I below.

TABLE I

| Acid | Yield (percent) | Product potency, units/milligram |
|---|---|---|
| Citric | 61.5 | 4,377 |
| Oxalic | 54.0 | 4,158 |
| Phosphoric | 46.8 | 2,770 |
| Perchloric | 78.5 | 3,412 |
| Hydrochloric | 67.3 | 3,292 |
| Sulfuric | 69.4 | 4,584 |

The best combination of yield and potency was obtained with sulfuric acid. Other acids, not tested above, may, of course, prove equal or superior to sulfuric.

EXAMPLE 5

Crystallization of nystatin from a butanol fermentation extract using various bases The procedure of Example 1 was repeated several times using bases as divergent in character as sodium hydroxide, ammonium hydroxide, triethylamine and triethanolamine in the neutralization step. In each case there was no significant effect on product yield or potency.

EXAMPLE 6

Crystallization of nystatin from a methylisobutyl ketone fermentation extract The starting material was prepared by diluting a portion of aqueous whole fermentation mash, obtained by fermenting strains of Streptomyces noursei, with sufficient methylisobutyl ketone to provide an approximate 1:3 methylisobutyl ketone-water ratio. The nystatin collected in the less dense methylisobutyl ketone layer and was separated by centrifugation. A 200 milliliter portion of this emulsion was combined with 160 milliliters of ethanol. The pH was adjusted to 2.6 with 6 N $H_2SO_4$ and then filtered using diatomaceous earth. The pH of the filtrate was adjusted to 7.1 with triethylamine and the solution was agitated for several hours. The crystalline product was collected by filtration, washed with ethanol, and dried in vacuo. The yield was 48% of a product having a microbiological assay of 3836 units/milligram.

EXAMPLE 7

Crystallization of nystatin from whole harvest mash

A 200 milliliter portion of whole harvest mash obtained by fermenting strains of Streptomyces noursei was combined with 200 milliliters of n-butanol and 100 milliliters of 2-ethoxyethanol. The pH of the mixture was lowered to 2.6 with dilute sulfuric acid. The pH was adjusted to 3.5 with triethylamine and then filtered with the aid of diatomaceous earth. The filtrate pH was adjusted to 7.1 with triethylamine and the solution was agitated for several hours while the nystatin crystallized. The product was collected by filtration, washed with a solvent of approximate mother liquor composition and dried in vacuo. The microbiological yield was 62% of a product having a microbiological assay 5300 units/milligram.

EXAMPLE 8

Crystallization of nystatin from whole harvest mash using a 50:50 v./v. ratio of n-butanol:2-ethoxyethanol and various volume/volume ratios of n-butanol-2-ethoxyethanol to whole harvest mash The procedure of Example 7 was repeated using a 50:50 mixture of n-butanol:2-ethoxyethanol and various volume/volume relationships of n-butanol-2-ethoxyethanol/whole harvest mash. The results, which show consistency in yield and purity, appear in Table II below:

TABLE II

| Mash volume | n-Butanol, 2-ethoxyethanol (50:50) volume (ml.) | Microbiological yield percent | Product potency. units/mg, |
|---|---|---|---|
| 100 ml | 100 | 75 | 4,860 |
| 100 ml | 80 | 78 | 5,430 |
| 100 ml | 60 | 78 | 4,750 |
| 100 ml | 40 | 70 | 4,460 |

EXAMPLE 9

Recrystallization of crude nystatin

A 2.0 gram portion of crude nystatin, assaying 2000 units per milligram was suspended in a mixture of 70 milliliters of n-butanol and 20 milliliters of 2-ethoxyethanol. The apparent pH of this mixture was adjusted to 2.5 with 6 N $H_2SO_4$. The mixture was diluted with 30 milliliters of water and the pH was readjusted to 2.5 with 6 N $H_2SO_4$. The solution was filtered. The filtrate was adjusted to pH 7.1 with triethylamine. Aging produced crystalline nystatin which was collected by filtration and dried. The product potency was 3700 units/milligram.

What is claimed is:

1. The process of recovering highly purified crystalline nystatin from a suspension of impure nystatin in a liquid phase consisting essentially of water and an aliphatic oxygen-containing organic solvent having a solubility in water of no more than 25 grams per 100 grams of water at 25° C. and in which nystatin is substantially insoluble which comprises adding to the suspension a diluting solvent selected from the group consisting of ethanol, 2-methoxyethanol, 2-ethoxyethanol, dimethylformamide and dioxane to provide a mixture containing 20–100% by volume of diluting solvent based on the volume of liquid phase, adjusting the pH of the resulting mixture to from about 2.0 to about 3.5 with an acid to effect solubilization of the nystatin, clarifying the mixture, adjusting the pH of the clarified solution to from about 4.5 to about 8.0 with a base, and recovering the resulting precipitate of crystalline nystatin therefrom.

2. A process according to claim 1 wherein the liquid phase is n-butanol saturated with water, the diluting solvent is 2-methoxyethanol, the acid is sulfuric acid and the base is triethylamine.

3. A process according to claim 1 wherein the liquid phase is methylisobutyl ketone saturated with water, the diluting solvent is 2-methoxyethanol, the acid is sulfuric acid and the base is triethylamine.

4. A process according to claim 1 wherein the liquid phase is a mixture of n-butanol and water, the diluting solvent is 2-ethoxyethanol, the acid is hydrochloric and the base is triethanolamine.

5. A process according to claim 1 wherein the liquid phase is a mixture of methylisobutyl ketone and water, the diluting solvent is 2-ethoxyethanol, the acid is hydrochloric acid and the base is triethanolamine.

6. A process according to claim 1 wherein the liquid phase is an emulsion consisting essentially of water and an aliphatic oxygen-containing organic solvent having a solubility in water of no more than 25 grams per 100 grams of water at 25° C. and in which nystatin is substantially insoluble.

7. A process according to claim 6 wherein the organic solvent is n-butanol, the diluting solvent is 2-methoxyethanol, the acid is sulfuric acid and the base is triethylamine.

8. A process according to claim 6 wherein the organic solvent is methylisobutyl ketone, the diluting solvent is dimethylformamide, the acid is phosphoric acid and the base is aqueous ammonia.

9. A process according to claim 1 wherein the suspension is a mixture of a *Streptomyces noursei* fermentation whole harvest mash and an aliphatic oxygen-containing organic solvent having a solubility in water of no more than 25 grams per 100 grams of water at 25° C. and in which nystatin is substantially insoluble such that the volume:volume ratio of mash:organic solvent is from about 1:1 to about 5:1.

10. A process according to claim 9 wherein the organic solvent is n-butanol.

References Cited

UNITED STATES PATENTS

| | | | |
|---|---|---|---|
| 2,786,781 | 3/1957 | Vandeputte et al. | 424—120 |
| 2,797,183 | 6/1957 | Hazen et al. | 424—120 |
| 3,332,844 | 7/1967 | Vandeputte et al. | 424—120 |

ALBERT T. MEYERS, Primary Examiner

D. M. STEPHENS, Assistant Examiner

U.S. Cl. X.R.

424—120